(12) United States Patent
Ma (10) Patent No.: US 8,755,670 B2
(45) Date of Patent: Jun. 17, 2014

(54) MULTIMEDIA SYSTEM, RELEVANT MULTIMEDIA INFORMATION DISPLAY DEVICE AND MULTIMEDIA INFORMATION TRANSMISSION METHOD

(71) Applicant: Realtek Semiconductor Corp., Hsinchu (TW)

(72) Inventor: Chen Ma, San Jose, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 13/624,582

(22) Filed: Sep. 21, 2012

(65) Prior Publication Data

US 2013/0266284 A1    Oct. 10, 2013

Related U.S. Application Data

(60) Provisional application No. 61/620,988, filed on Apr. 6, 2012.

(30) Foreign Application Priority Data

Aug. 28, 2012  (TW) .............................. 101131261 A (51) Int. Cl.
| | | |
|---|---|---|
| *H04N 9/80* | (2006.01) | |
| *H04N 5/92* | (2006.01) | |
| *G11B 27/00* | (2006.01) | |
| *H04N 5/93* | (2006.01) | |

(52) U.S. Cl.
USPC ........... 386/239; 386/240; 386/241; 386/243; 386/278; 386/280; 386/282; 386/326

(58) Field of Classification Search
USPC ......... 386/239, 240, 241, 243, 278, 280, 282, 386/326
See application file for complete search history.

(56) References Cited

U.S. PATENT DOCUMENTS

| | | | |
|---|---|---|---|
| 6,580,870 B1 * | 6/2003 | Kanazawa et al. ............ | 386/240 |
| 8,437,605 B2 * | 5/2013 | Cho et al. ...................... | 386/240 |
| 2004/0150530 A1 * | 8/2004 | Haruki ..................... | 340/825.72 |
| 2011/0179383 A1 | 7/2011 | Morris | |
| 2012/0144418 A1 | 6/2012 | Morris et al. | |
| 2013/0295893 A1 | 11/2013 | Roberts | |

* cited by examiner

*Primary Examiner* — Daquan Zhao
(74) *Attorney, Agent, or Firm* — Birch, Stewart, Kolasch & Birch, LLP (57) ABSTRACT

A multimedia system is disclosed, having a multimedia playback device and a multimedia information display device. The multimedia playback device is used to provide the multimedia content received from a multimedia transmission device. The multimedia information display device has a display device, a wireless communication device, and a signal processing device for cooperating with the multimedia playback device. The wireless communication device of the multimedia information display device receives the multimedia information. The signal processing device configures the display device to display the multimedia information pertinent to the multimedia content played on the multimedia playback device.

17 Claims, 7 Drawing Sheets

MULTIMEDIA SYSTEM, RELEVANT MULTIMEDIA INFORMATION DISPLAY DEVICE AND MULTIMEDIA INFORMATION TRANSMISSION METHOD

CROSS-REFERENCE TO RELATED APPLICATIONS

This application claims the benefit of priority to U.S. Provisional Application Ser. No. 61/620,988, filed on Apr. 6, 2012; the entirety of which is incorporated herein by reference for all purposes.

This application claims the benefit of priority to Taiwanese Patent Application No. 101131261, filed on Aug. 28, 2012; the entirety of which is incorporated herein by reference for all purposes.

BACKGROUND

The disclosure generally relates to a multimedia system and, more particularly, to the multimedia system with a multimedia playback device and a multimedia information display device.

Nowadays, diverse multimedia content, e.g., news, soap operas, videos, pictures, and music, has already become the indispensable element of human life. Many people therefore are used to obtaining the consuming information, the travel information, the educational information, etc. from the multimedia content. For example, many people may be interested in the appliances, the scenes, the restaurants, or the costumes appeared in a movie.

For example, the consuming information is often presented in the form of television advertisements which are played between the programs. The television advertisements are usually very short because of the expensive cost, and the audiences lose the focus easily in various television advertisements mixed in the short period of time. Therefore, the traditional television advertisements are getting more and more difficulties in catching the consumers' eyes. Alternatively, some consuming information is shown along with the multimedia content. For example, the consuming information is superimposed on the multimedia content or appears as the ticker at the edge of the multimedia content. The presentation of the consuming information is, however, usually limited by the resolution of the display device and the layout of the multimedia content. Moreover, the viewing quality is severely influenced and the consuming information may bother the audience who are not interested. The multimedia information still may not be delivered to the target audience effectively and may even irritate the uninterested audience.

On the other hand, if the viewers may not obtain the multimedia information pertinent to the interested part of the multimedia content, they must perform searches on the Internet or through other channels. The viewer must spend unnecessary time for searching the pertinent multimedia information and sometime still cannot find the correct multimedia information.

SUMMARY

An example embodiment of a multimedia system, comprising: a multimedia transmission device for transmitting a multimedia content; a multimedia playback device for providing the multimedia content received from the multimedia transmission device; and a multimedia information display device, comprising a display, a wireless communication device, and a signal processing device; wherein the wireless communication device of the multimedia information display device receives a multimedia information pertinent to the multimedia content; the multimedia information comprises a plurality of instances, each of which comprises at least one time-related field; at least one of the instances is pertinent to one of a plurality of targets of the multimedia content; the signal processing device configures the display to display the content of at least one field of a first instance of the instances according to the time-related field of the first instance; and the targets of the multimedia content comprise at least one of people, objects, sounds, scenes, and times played on the multimedia playback device.

Another example embodiment of a multimedia information display device, comprising: a display; a wireless communication device for receiving a multimedia information pertinent to a multimedia content played on a multimedia playback device, wherein the multimedia information comprises a plurality of instances, each of which comprises at least one time-related field, and at least one of the instances is pertinent to one of a plurality of targets of the multimedia content; and a signal processing device for configuring the display to display the content of at least one field of a first instance of the instances according to the time-related field of the first instance; wherein the targets of the multimedia content comprise at least one of people, objects, sounds, scenes, and times played on the multimedia playback device.

Another example embodiment of a multimedia information transmission method, comprising: receiving a multimedia content transmitted by a multimedia transmission device, wherein the multimedia content comprising a plurality of targets; receiving a multimedia information pertinent to the multimedia content, wherein the multimedia information comprises a plurality of instances, each of which comprises at least one time-related field, and at least one of the instances is pertinent to one of the targets of the multimedia content; displaying the multimedia content on a multimedia playback device; and transmitting the multimedia information to a multimedia information display device so that the multimedia display device displays the content of at least one field of a first instance of the instances according to the time-related field of the first instance; wherein the targets of the multimedia content comprise at least one of people, objects, sounds, scenes, and times played on the multimedia playback device.

Another example embodiment of a multimedia information transmission method, comprising: receiving a multimedia content transmitted by a multimedia transmission device, wherein the multimedia content comprising a plurality of targets; receiving a multimedia information pertinent to the multimedia content, wherein the multimedia information comprises a plurality of instances, each of which comprises at least one time-related field, and at least one of the instances is pertinent to one of the targets of the multimedia content; displaying the multimedia content on a multimedia playback device; and transmitting the multimedia information to a multimedia information display device so that the multimedia display device displays the content of at least one field of a first instance of the instances according to the time-related field of the first instance: wherein the targets of the multimedia content comprise at least one of people, objects, sounds, scenes, and times played on the multimedia playback device.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings.

Figure 1:
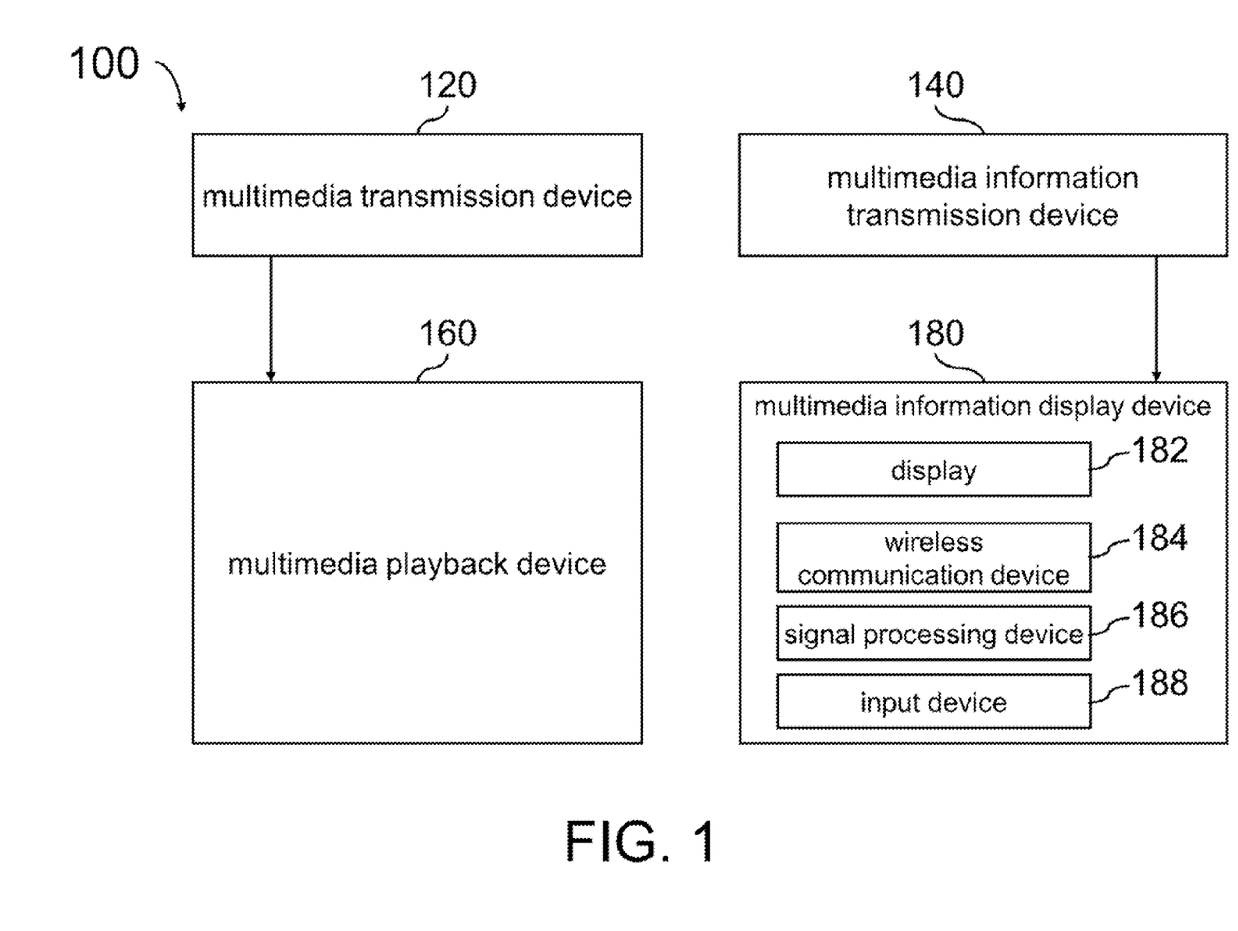
FIG. 1 shows a simplified functional block diagram of an example multimedia system.
Figure 2:
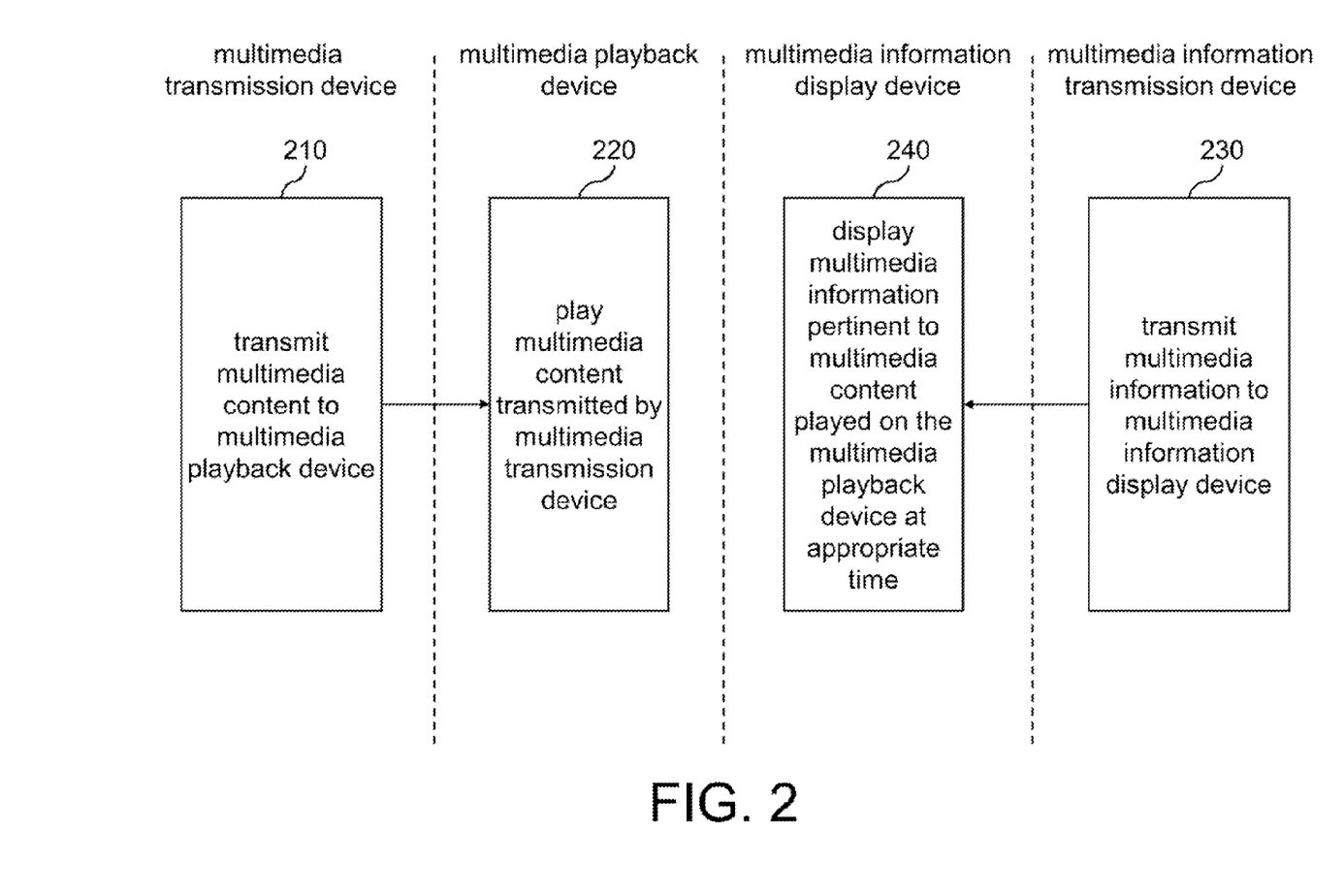
FIG. 2 shows a simplified flowchart of an example operating method of the multimedia system in FIG. 1.

FIG. 1 shows a simplified functional block diagram of an example multimedia system 100. FIG. 2 shows a simplified flowchart of an example operating method of the multimedia system 100. The operation of the multimedia system 100 is explained below with FIGS. 1 and 2.

The multimedia system 100 comprises a multimedia transmission device 120, a multimedia information transmission device 140, a multimedia playback device 160, and a multimedia information display device 180.

The multimedia transmission device 120 may be used to transmit cable television signals, terrestrial television signals, multimedia signals through the internet, multimedia signals through other suitable transmission media, etc. For example, the multimedia transmission device 120 may be realized with a cable television station, a terrestrial television station, and/or a multimedia website. The multimedia transmission device 120 may transmit the multimedia content to the multimedia playback device 160 through wired and/or wireless connections so that the multimedia playback device 160 may play the multimedia content.

The multimedia information transmission device 140 may also be realized with a cable television station, a terrestrial television station, and/or a multimedia website. The multimedia information transmission device 140 may transmit the multimedia information pertinent to the multimedia content transmitted by the multimedia transmission device 120.

The multimedia playback device 160 is used to receive and play the multimedia content transmitted by the multimedia transmission device 120. For example, the multimedia playback device 160 may be realized with a television, a projector, a computer, and/or other suitable devices for demonstrating the multimedia content to the user with the audio and/or visual providing device thereof.

The multimedia information display device 180 may be realized with a tablet computer, a laptop computer, a mobile phone, or other portable devices. The multimedia information display device 180 comprises a display 182, a wireless communication device 184, a signal processing device 186, and an input device 188. The multimedia information display device 180 may receive the multimedia information transmitted by the multimedia information transmission device 140 with the wireless communication device 184, e.g., through the wireless LAN network and the mobile communication network. The signal processing device 186 may configure the display 182 to display the multimedia information pertinent to the multimedia content played on the multimedia display device 160. The input device 188 may be realized with a keyboard, a pointing device, a touch sensitive device, and/or other suitable human interface devices for receiving the inputs of the user.

In FIG. 2, an example operating method of the multimedia system 100 is shown.

In the operation 210, the multimedia transmission device 120 transmits the multimedia content to the multimedia playback device 160.

In the operation 220, the multimedia playback device 160 plays the multimedia content transmitted by the multimedia transmission device 120.

In the operation 230, the multimedia information transmission device 140 transmits the multimedia information to the multimedia information display device 180. At least part of the transmitted multimedia information is pertinent to the multimedia content played on the multimedia playback device 160 in the operation 220.

In the operation 240, the multimedia information display device 180 displays the multimedia information transmitted by the multimedia information transmission device 140 at suitable time according to the user's setting or according to the default setting of the multimedia information. Therefore, the multimedia information displayed on the multimedia information display device 180 may be pertinent to the multimedia content played on the multimedia display device 160.

In FIG. 2, the order or the timing of the operations 210-240 may be suitably adjusted according to different application environments.

In one embodiment, the operations 210 and 230 are performed at substantially the same time. For example, when the terrestrial television station broadcasts the multimedia content, at substantially the same time, the multimedia information transmission device 140 may transmit the multimedia information pertinent to the broadcast multimedia content to the multimedia information display device 180. The operations 220 and 240 may also be performed at substantially the same time. Thus, the user may watch the multimedia content on the multimedia display device 160 and concurrently browse the multimedia information pertinent to the multimedia content displayed on the multimedia information display device 180.

In other embodiments, the operations 210 and 230 may be performed at different times. For example, in the operation 210, the multimedia transmission device 120 may transmit the multimedia content to the multimedia display device 160 in advance. Later on, when the user watches the multimedia content in the operation 220, the operations 230 and 240 are performed so that the multimedia information display device 180 may receive and display the multimedia information pertinent to the displayed multimedia content.

In other embodiments, the operation 230 is performed first so that the multimedia information transmission device 140 may transmit the multimedia information to the multimedia information display device 180. Later on, the multimedia transmission device 120 transmits the multimedia content to the multimedia playback device 160 in the operation 210. Thus, when the operations 220 and 240 are performed, the user may watch the multimedia content on the multimedia display device 160 and concurrently browse the multimedia information pertinent to the multimedia content displayed on the multimedia information display device 180.

When the user watches the multimedia content on the multimedia display device 160, the multimedia information display device 180 may display the content of one or more instances of the multimedia information pertinent to the multimedia content displayed on the multimedia playback device 160 according to the time-related field(s) of the instance(s) of the multimedia information. Besides, the multimedia information display device 180 may update the multimedia information displayed on the display 182 as the multimedia content varies on the multimedia playback device 160.

In other embodiments, the user may enter the channel number or the program identification code of the multimedia content through the input device 188. Accordingly, the signal processing device 186 may configure the wireless communication device 184 to request and receive the multimedia information pertinent to the multimedia content watched by the user from the multimedia information transmission device 140. The signal processing device 186 may further configures the display 182 to display the instance(s) of the pertinent multimedia information according to the time-related field(s) of the instance(s).

In other embodiments, the user may want to spend more time watching specific instances of the multimedia information, reviewing some past instances of the multimedia information, and/or previewing some future instances of the multimedia information. The signal processing device 186 may also configures the input device 188 to receive the inputs of the user (e.g., enter the time code of the multimedia content or move the scroll bar on the screen) so as to display the multimedia information required by the user.

The multimedia information may comprise one or more instances. An instance comprises a set of information specifically edited for the multimedia content transmitted by the multimedia transmission device 120. An instance may comprise a plurality of fields. For example, the instance may be a set of information specifically edited for a person, an object, a sound, a scene, and/or a time (referred to as "target" in this disclosure for conciseness) appeared in the multimedia content. When a target is played on the multimedia playback device 160, the multimedia information pertinent to the target may be synchronously displayed on the multimedia information display device 180. Thus, the user may watch the multimedia content on the multimedia playback device 160 without the interference of the excess multimedia information, and may instantaneously find out the multimedia information pertinent to the target in the multimedia content on the multimedia information display device 180.

When a target is played on the multimedia playback device 160, the multimedia information display device 180 must display the pertinent multimedia information at appropriate time. Therefore, in one embodiment, the instance comprises one or more time-related fields, and the multimedia information display device 180 may synchronously display the pertinent multimedia information according to the time-related field(s). The time-related field may be used to record any suitable type of time information, e.g., the beginning time of displaying the instance, the end time of displaying the instance, the timespan of displaying the instance, and/or other time codes of displaying the instance, so that the signal processing device 186 may determine the appropriate time for displaying the instance.

The instance may further comprises other fields, e.g., a target name field, a target property field, a target description field, a user evaluation field, a hyperlink field, a publish time field, an editing time field, and a priority field. Thus, the multimedia information display device 180 may display the content of one or more fields of the instance(s) on the display 182 according to the user's setting or according to the default setting of the multimedia information.

Furthermore, one or more instances may compose a story focused on a specific topic. The story may also comprise similar fields, e.g., a story name field, a story description field, a story identification code field, so that the user may easily choose the preferred stories.

The multimedia content publisher, the multimedia content provider, the publicity staff of the actor, the marketing company, or other multimedia information providers may prepare a variety of stories for different types of audience. For example, the multimedia information provider may prepare a plurality of instances, which are pertinent to the costumes appeared in the multimedia content, to compose a costume-related story. The user may obtain the prices, the sizes, and/or the retailers of the costumes from the costume-related story. The multimedia information provider may also prepare a plurality of instances, which are pertinent to the scenes appeared in the multimedia content, to compose a scene-related story. The user may obtain the geographic locations, the websites, and/or the travel information of the scenes from the scene-related story. The multimedia information provider may also prepare a plurality of instances, which are pertinent to an actor in the multimedia content, to compose an actor-specific story. The user may obtain the background, the official website, and/or the recent activities of the actor from the actor-specific story.

Figure 3:
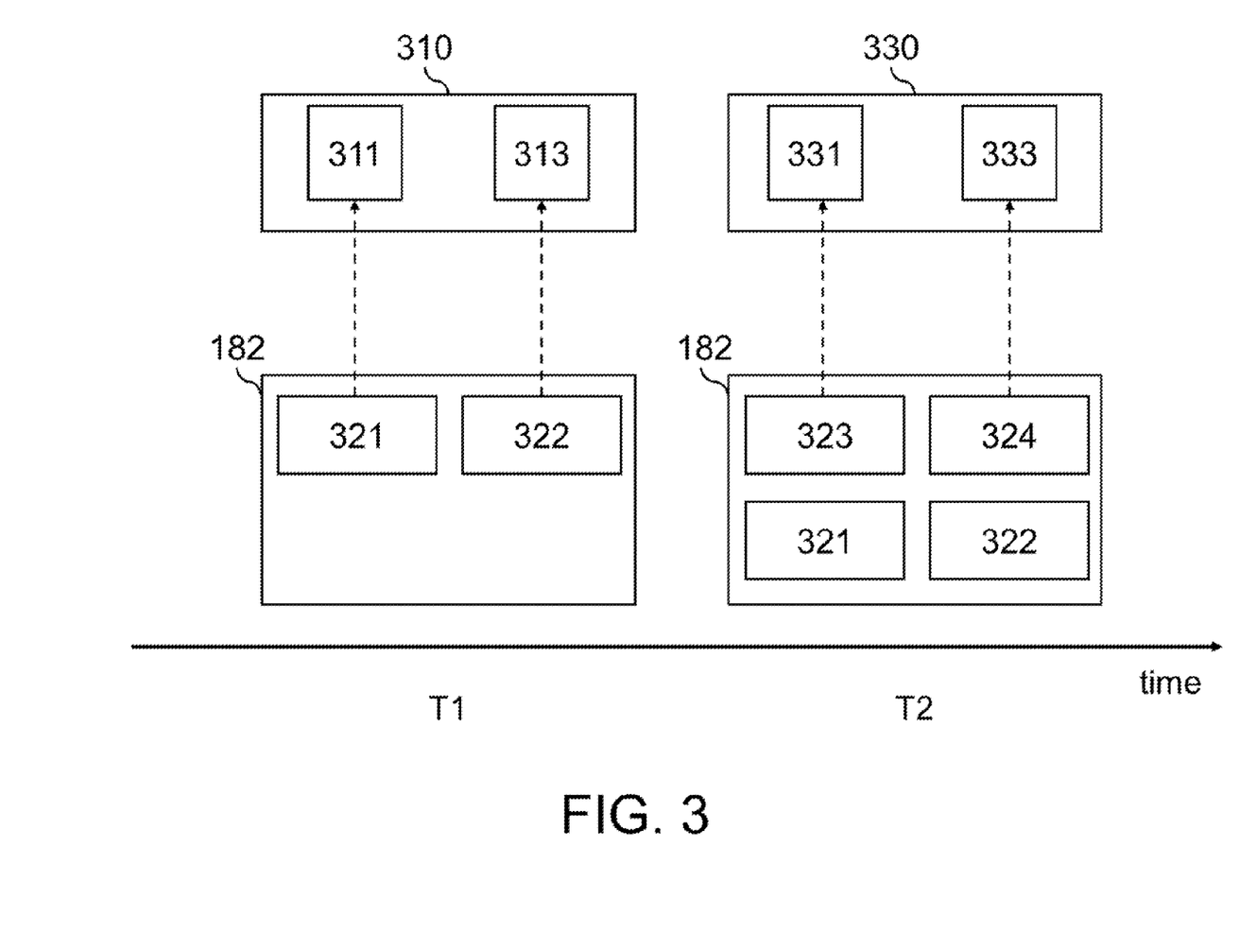
FIG. 3 shows a simplified schematic diagram of the example multimedia content and the pertinent multimedia information shown in the multimedia system in FIG. 1.

For example, in the embodiment in FIG. 3, the multimedia playback device 160 displays the image frames 310 and 330 respectively in the periods of time T1 and T2. The image frame 310 comprises the targets 311 and 313, and the image frame 330 comprises the targets 331 and 333. When the multimedia playback device 160 presents the image frame 310 in the period of time T1, the display 182 of the multimedia information display device 180 displays the content of one or more fields of the instances 321 and 322, accordingly. When the multimedia playback device 160 presents the image frame 330 in the period of time T2, the display 182 of the multimedia information display device 180 displays the content of one or more fields of the instances 321, 322, 323, and 324, accordingly. In the embodiment in FIG. 3, the instances 321 and 322 are pertinent to the targets 311 and 313, and the instances 323 and 324 are pertinent to the targets 331 and 333.

Moreover, the multimedia information provider may transmit one or more stories pertinent to the multimedia content with the multimedia information transmission device 140. The stories may be categorized according to different criteria. Therefore, the user of the multimedia information display device 180 may easily obtain the required information by choosing the stories according to the story name field, the story description field, the story identification code field, etc. of the stories. For example, the user may configure the multimedia information display device 180 to only display the multimedia information pertinent to the costumes and hide other type of multimedia information. Furthermore, the user may also filter and/or browse the multimedia information with one or more fields of the instances. The signal processing device 186 may configure the display 182 to display the content of one or more fields of the instances, and the user may enter the filtering criteria with the input device 188. For example, the user may configure the multimedia information display device 180 to only display the stories with the score of the user evaluation field greater than a specific value. Thus, the user may filter or browse the multimedia information with one or more fields of the instances or the stories so as to obtain the required information quickly and precisely.

Figure 4:
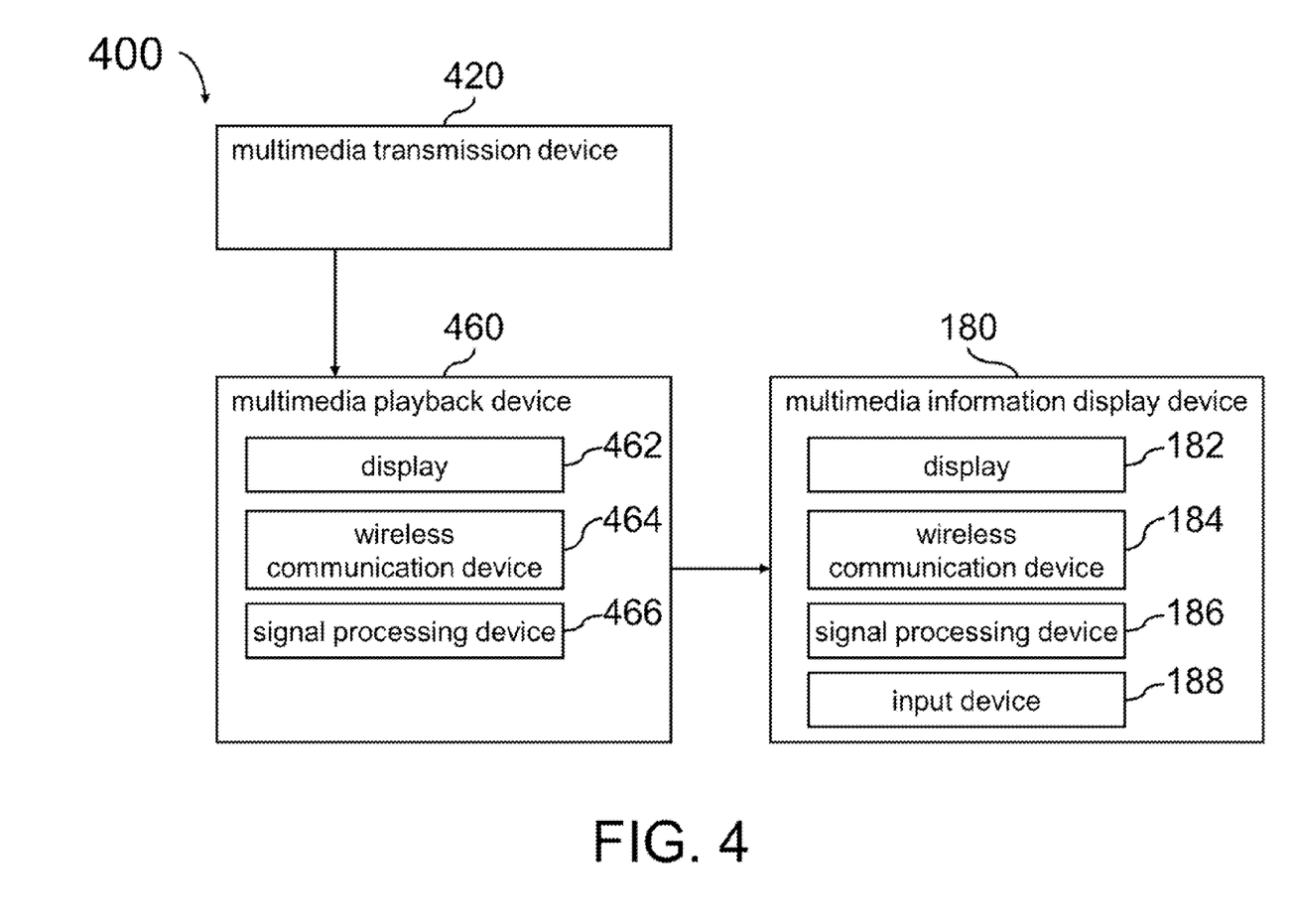
FIG. 4 shows a simplified functional block diagram of another example multimedia system.
Figure 5:
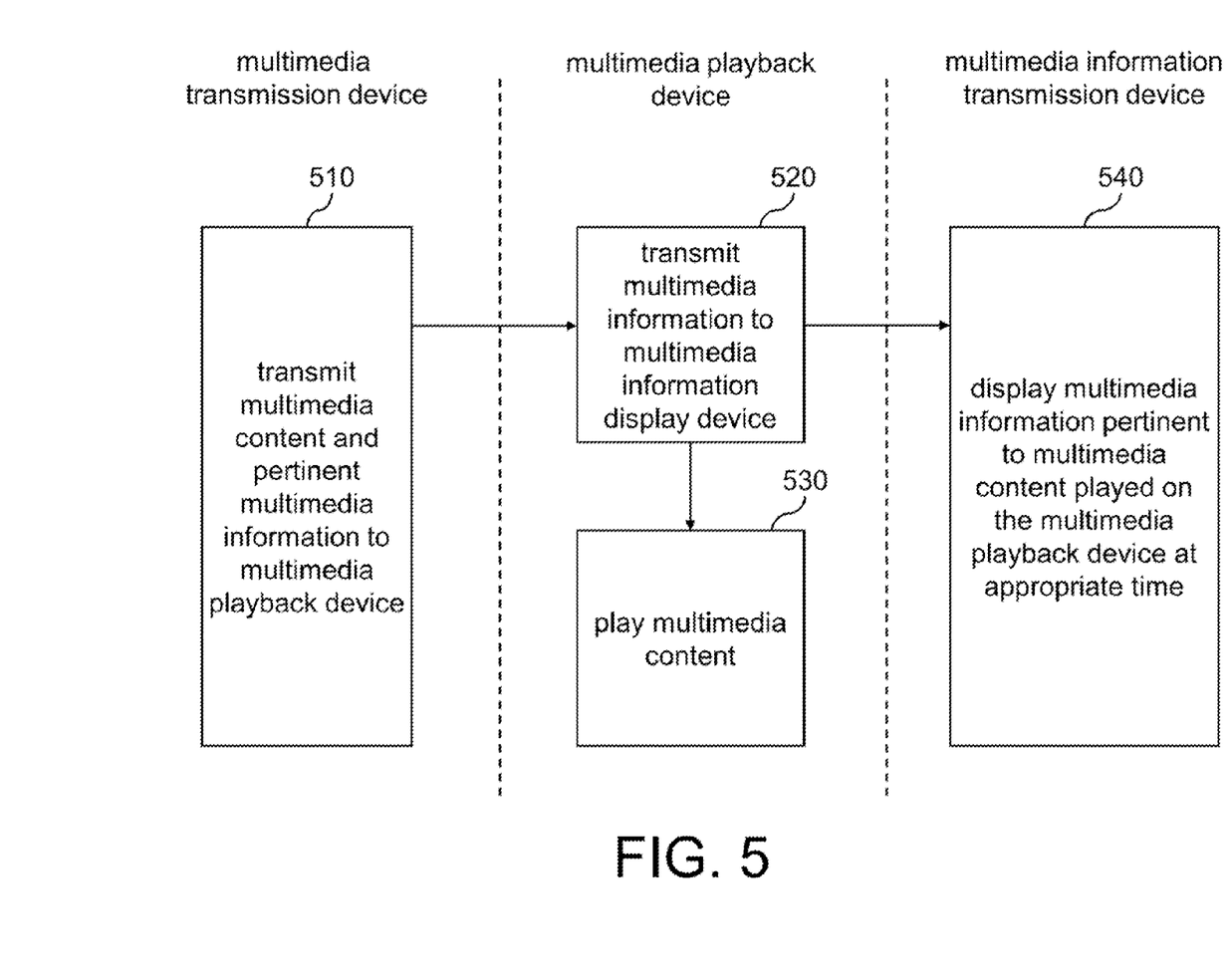
FIG. 5 shows a simplified flowchart of an example operating method of the multimedia system in FIG. 4.
Figure 6:
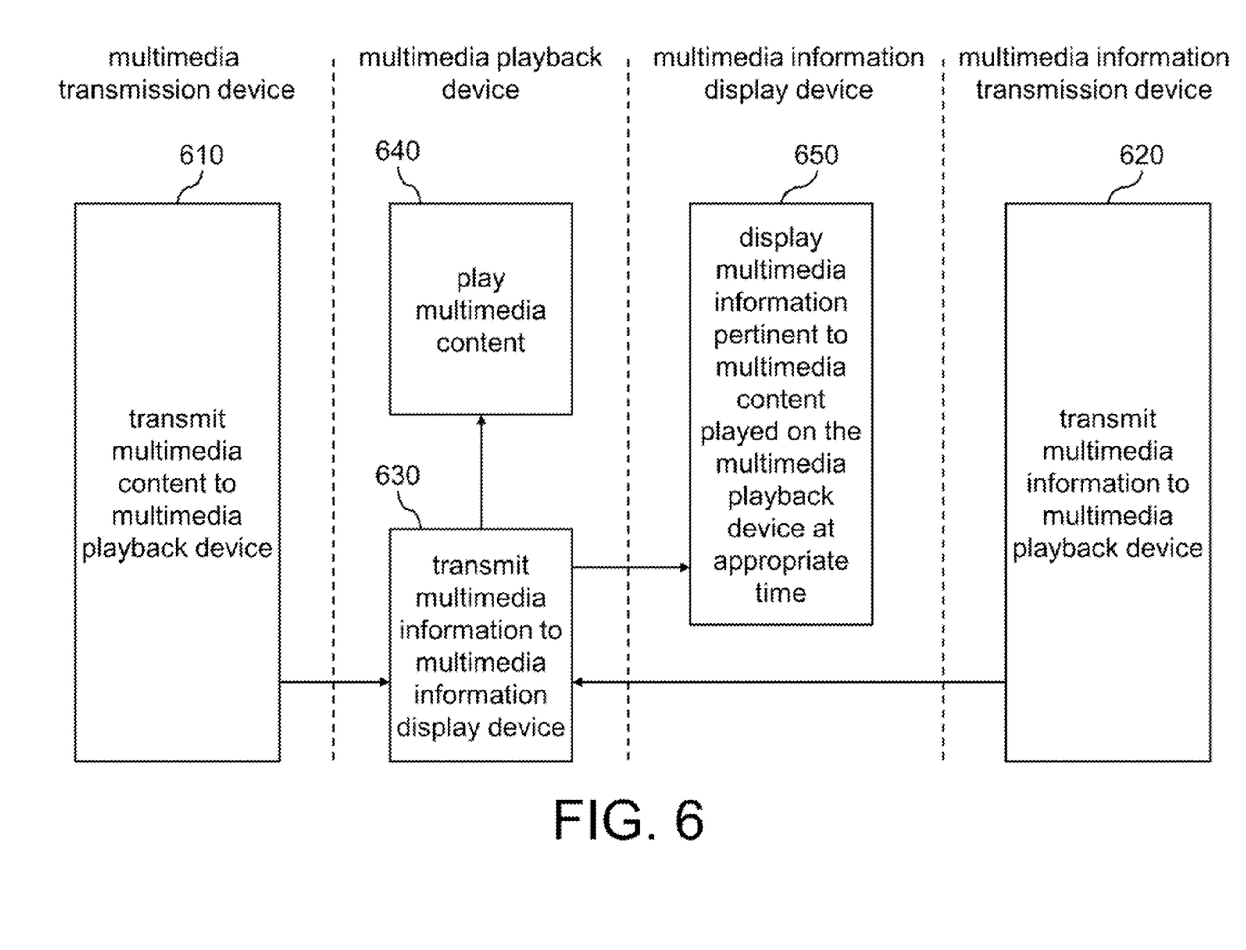
FIG. 6 shows a simplified flowchart of another example operating method of the multimedia system in FIG. 4.

FIG. 4 shows a simplified functional block diagram of another example multimedia system 400. FIG. 5 shows a simplified flowchart of an example operating method of the multimedia system 400. FIG. 6 shows a simplified flowchart of another example operating method of the multimedia system 400. The operation of the multimedia system 400 is further explained below with FIGS. 4-6.

The multimedia system 400 comprises a multimedia transmission device 420, a multimedia playback device 460, and a multimedia information display device 180. The multimedia playback device 460 comprises a display 462, a wireless communication device 464, and a signal processing device 466. The multimedia information display device 180 may be realized in a manner similar to or in the same manner as the embodiments in FIG. 1.

In FIG. 5, an example operating method of the multimedia system 400 is shown.

In the operation 510, the multimedia transmission device 420 transmits the multimedia content and the pertinent multimedia information to the multimedia playback device 460 through wired or wireless connections. For example, the multimedia transmission device 420 may be realized with a cable television station, a terrestrial television station, a multimedia website, a DVD player, a computer, or other multimedia players.

In the operation 520, the multimedia playback device 460 receives the multimedia content and the pertinent multimedia information. Moreover, the multimedia playback device 460 transmits the pertinent multimedia information to the multimedia information display device 180 through the wireless communication device 464.

In the operation 530, the signal processing device 466 configure the display 462 to display the multimedia content.

In the operation 540, the multimedia information display device 180 receives the multimedia information transmitted by the multimedia playback device 460 through the wireless communication device 184. The signal processing device 186 configures the display 182 to display the multimedia information pertinent to the multimedia content played on the multimedia playback device 460 according to the time-related field(s) of the instance(s) of the multimedia information.

In FIG. 5, the order or the timing of the operations 510-540 may be suitably adjusted according to different application environments. For example, the operations 530 and 540 may be performed at substantially the same time so that the user may watch the multimedia content on the multimedia display device 460 and concurrently browse the multimedia information pertinent to the multimedia content displayed on the multimedia information display device 180.

In the embodiment in FIG. 6, the multimedia playback device 460 receives the multimedia content and the pertinent multimedia information from different sources.

In the operation 610, the multimedia transmission device 420 transmits the multimedia content to the multimedia playback device 460 through wired or wireless connections.

In the operation 620, the multimedia information transmission device (not shown in FIG. 4) transmits the multimedia information to the multimedia playback device 460. At least part of the multimedia information is pertinent to the multimedia content transmitted by the multimedia transmission device 420 in the operation 610.

In the operation 630, the multimedia playback device 460 transmits the pertinent multimedia information to the multimedia information display device 180 through the wireless communication device 464.

In the operation 640, the signal processing device 466 configure the display 462 to display the multimedia content.

In the operation 650, the multimedia information display device 180 receives the multimedia information transmitted by the multimedia playback device 460 through the wireless communication device 184. The signal processing device 186 configures the display 182 to display the multimedia information pertinent to the multimedia content played on the multimedia playback device 460 according to the time-related field(s) of the instance(s) of the multimedia information.

In FIG. 6, the order or the timing of the operations 610-650 may be suitably adjusted according to different application environments. For example, the operations 610 and 620 may be performed at substantially the same time or different times, and the operations 640 and 650 may be performed at substantially the same time.

In the above embodiments, the user may choose one or more stories by using the input device 188. Moreover, sometimes the display 182 may need to display a plurality of instances in the same period of time. The signal processing device 186 may perform filtering operations or comparison operations on the field(s) of the instance(s) so as to determine the layout and the content of the instances to be presented on the display device 182 of the multimedia information display device 180. Therefore, the user may effective obtain the required information from the display 182.

For example, when the instances needed to be shown do not fit in a single image frame on the display 182 of the multimedia information display device 180, the signal processing device 186 may configure the locations, the dimensions, and other display styles of the instances according to the priority fields, the time-related fields, or other fields of the instances. Therefore, the instances more pertinent to the users requirement may be presented more conspicuously on the display 182.

Figure 7:
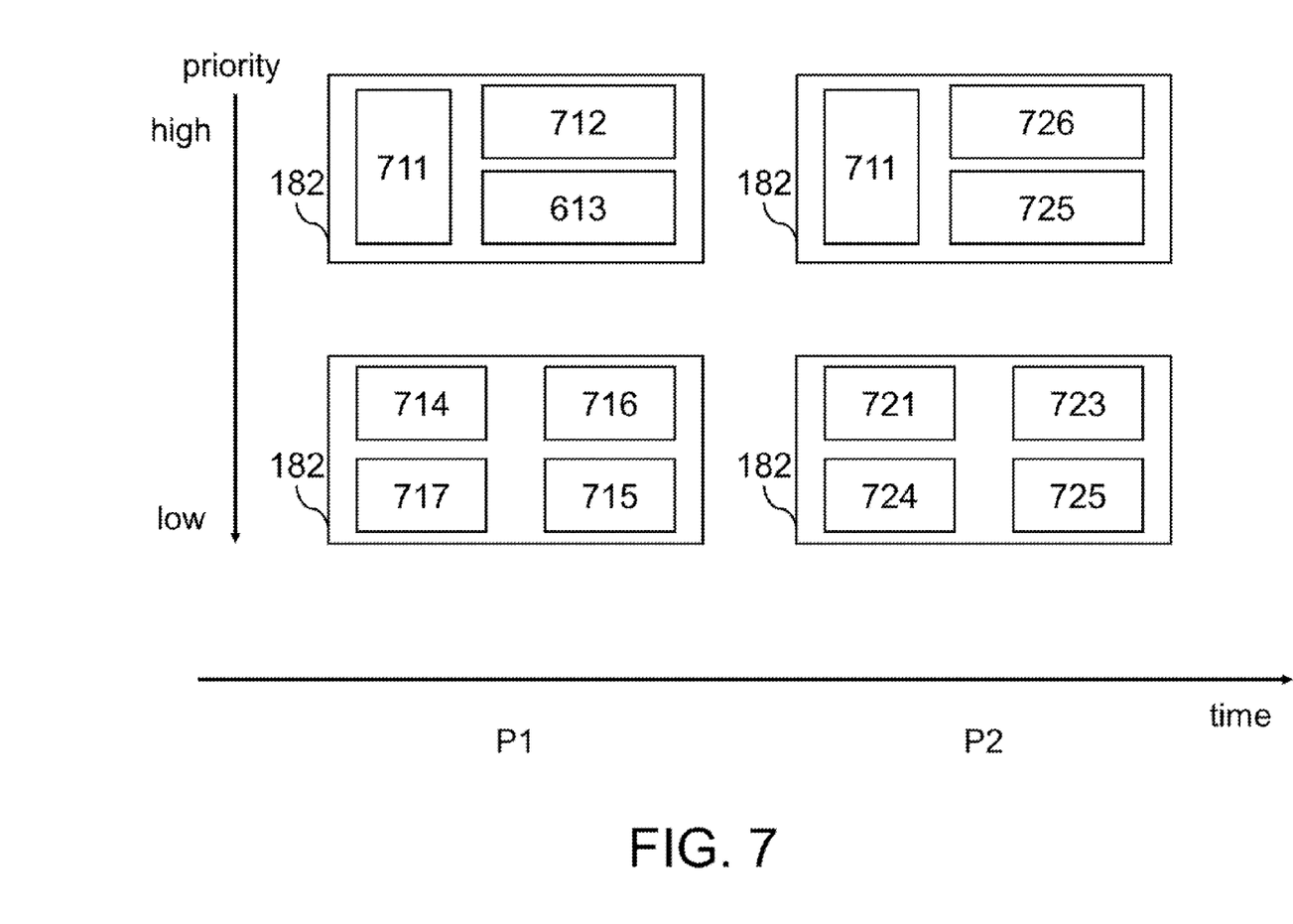
FIG. 7 shows a simplified schematic diagram of the example multimedia content and the pertinent multimedia information, all in accordance with at least some embodiment described herein.

In the embodiment in FIG. 7, in the period of time P1, the signal processing device 186 configures the display 182 to display the content of one or more fields of the instances 711, 712, and 713 according to the priority fields, the time-related fields, or other fields of the instances. The user may perform the click operation, the slide operation, or other inputs through the input device 188 to change the presentation on the display 182. For example, the user may configure the multimedia information display device 180 to display the content of one or more fields of the lower priority instances 714, 715, 716, and 717 by performing a sliding operation on the input device 188.

In the period of time P2, the signal processing device 186 configures the display 182 to display the content of one or more fields of the instances 711, 725, and 726 according to the priority fields, the time-related fields, or other fields of the instances. In this embodiment, the instances 712-715 are not needed to be shown in the period of time P2, and the content of one or more fields of the lower priority instances 721-724 may be displayed according to the user's inputs to the input device 188.

In the operation 210 in FIG. 2, the multimedia information transmission device 140 may synchronously transmit the multimedia information pertinent to the multimedia content to the multimedia information display device 180. In other embodiments, the multimedia information transmission device 140 may transmits the multimedia information to the multimedia information display device 180 in advance of displaying the multimedia content on the multimedia playback device 160. Thus, the multimedia information display device 180 may have an enough processing time to display the multimedia information pertinent to the multimedia content played on the multimedia playback device 160.

In the embodiments above, the multimedia information display device 180 may display the multimedia information pertinent to the multimedia content played on the multimedia playback device 160 or 460 according to the time-related field(s) of the instance(s) of the multimedia information. For example, the multimedia information display device 180 may display the multimedia information pertinent to the multimedia content at appropriate time according to the time-related field(s) of the instance(s) and according to the output of the real time clock device. In other embodiments, the multimedia information display device 180 may obtain the timing information from the synchronization signals of the multimedia information transmission device 140, the multimedia playback device 160, and/or the multimedia playback device 460, and display the multimedia information at appropriate time accordingly.

In other embodiments, the user may configure the multimedia information display device 180 to synchronously display the multimedia information pertinent to the multimedia content display on the multimedia playback device 160 or 460 in a semiautomatic manner or in a manual manner, e.g., displaying the pertinent multimedia information by entering the story identification code field of the story or the time-related field of the instance.

In the embodiments above, the signal processing device 186 may configure the instances with different priority to be displayed with different dimensions, colors, shapes, fonts, or other audio/visual effects according to the priority field(s) and/or time-related field(s) of the instances.

In the embodiments above, the multimedia information display device may display the multimedia information pertinent to the multimedia content played on the multimedia playback device by receiving and processing the multimedia information transmitted from the multimedia information transmission device and/or the multimedia playback device. Therefore, the user may precisely and instantaneously obtain the require information. In the meanwhile, the multimedia content displayed on the multimedia playback device is not influenced by the excess multimedia information, and the viewing quality may still be maintained.

Moreover, the multimedia information providers may precisely categorize and generate different multimedia information for the audience according to the field(s) of the stories and the field(s) of the instances of the multimedia information, and the users may choose the multimedia information according to the preference.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

What is claimed is:

1. A multimedia system, comprising:
   a multimedia transmission device for transmitting a multimedia content;
   a multimedia playback device for providing the multimedia content received from the multimedia transmission device; and
   a multimedia information display device, comprising a display, a wireless communication device, and a signal processing device;
   wherein the wireless communication device of the multimedia information display device receives a multimedia information pertinent to the multimedia content; the multimedia information comprises a plurality of instances, each of which comprises at least one time-related field; at least one of the instances is pertinent to one of a plurality of targets of the multimedia content; the signal processing device configures the display to display the content of at least one field of a first instance of the instances according to the time-related field of the first instance; the targets of the multimedia content comprise at least one of people, objects, sounds, scenes, and times played on the multimedia playback device; and each of the instances comprises a priority field and the signal processing device configures the locations of the instances displayed on the display according to the priority fields of the instances; and the signal processing device configures the display to display the instances with higher priority value in the priority field in a more conspicuous manner.

2. A multimedia information display device comprising:
   a display;
   a wireless communication device for receiving a multimedia information pertinent to a multimedia content played on a multimedia playback device, wherein the multimedia information comprises a plurality of instances, each of which comprises at least one time-related field, and at least one of the instances is pertinent to one of a plurality of targets of the multimedia content; and
   a signal processing device for configuring the display to display the content of at least one field of a first instance of the instances according to the time-related field of the first instance;
   wherein the targets of the multimedia content comprise at least one of people, objects, sounds, scenes, and times played on the multimedia playback device; and each of the instances comprises a priority field and the signal processing device configures the locations of the instances displayed on the display according to the priority fields of the instances; and the signal processing device configures the display to display the instances with higher priority value in the priority field in a more conspicuous manner.

3. The device of claim 2, wherein the signal processing device configures the dimensions of the instances displayed on the display according to the priority fields of the instances.

4. The device of claim 2, wherein each of the instances comprises at least one of a target name field, a target property field, a target description field, a user evaluation field, a hyperlink field, a publish time field, and an editing time field.

5. The device of claim 2, wherein the time-related field of the first instance is used to record at least one of a beginning time of displaying the first instance, an end time of displaying the first instance, a timespan of displaying the first instance, and a time code of displaying the first instance.

6. The device of claim 2, wherein the wireless communication device receive the multimedia information from a multimedia information transmission device.

7. The device of claim 2, wherein the wireless communication device receive the multimedia information from the multimedia playback device.

8. A multimedia information transmission method, comprising:
- transmitting a multimedia content with a multimedia transmission device, wherein the multimedia content comprising a plurality of targets; and
- transmitting a multimedia information pertinent to the multimedia content with a multimedia information transmission device, wherein the multimedia information comprises a plurality of instances, each of which comprises at least one time-related field, and at least one of the instances is pertinent to one of the targets of the multimedia content;
- wherein when a multimedia playback device plays the multimedia content, a multimedia information display device receives the multimedia information and display the content of at least one field of a first instance of the instances according to the time-related field of the first instance; the targets of the multimedia content comprise at least one of people, objects, sounds, scenes, and times played on the multimedia playback device; and each of the instances comprises a priority field and the signal processing device configures the locations of the instances displayed on the display according to the priority fields of the instances; and the multimedia information display device displays the instances with higher priority value in the priority field in a more conspicuous manner.

9. The method of claim 8, wherein the multimedia information display device configures the dimension of the instances displayed on the display of the multimedia information display device according to the priority fields of the instances.

10. The method of claim 8, wherein each of the instances comprises at least one of a target name field, a target property field, a target description field, a user evaluation field, a hyperlink field, a publish time field, and an editing time field.

11. The method of claim 8, wherein the time-related field of the first instance is used to record at least one of a beginning time of displaying the first instance, an end time of displaying the first instance, a timespan of displaying the first instance, and a time code of displaying the first instance.

12. A multimedia information transmission method, comprising:
- receiving a multimedia content transmitted by a multimedia transmission device, wherein the multimedia content comprising a plurality of targets;
- receiving a multimedia information pertinent to the multimedia content, wherein the multimedia information comprises a plurality of instances, each of which comprises at least one time-related field, and at least one of the instances is pertinent to one of the targets of the multimedia content;
- displaying the multimedia content on a multimedia playback device; and
- transmitting the multimedia information to a multimedia information display device so that the multimedia display device displays the content of at least one field of a first instance of the instances according to the time-related field of the first instance;
- wherein the targets of the multimedia content comprise at least one of people, objects, sounds, scenes, and times played on the multimedia playback device; and each of the instances comprises a priority field and the multimedia information display device configures the locations of the instances displayed on a display of the multimedia information display device according to the priority fields of the instances; wherein the multimedia information display device displays the instances with higher priority value in the priority field in a more conspicuous manner.

13. The method of claim 12, wherein the multimedia information is transmitted by the multimedia transmission device.

14. The method of claim 12, wherein the multimedia information is transmitted by a multimedia information transmission device.

15. The method of claim 12, wherein the multimedia information display device configures the dimension of the instances displayed on a display of the multimedia information display device according to the priority fields of the instances.

16. The method of claim 12, wherein each of the instances comprises at least one of a target name field, a target property field, a target description field, a user evaluation field, a hyperlink field, a publish time field, and an editing time field.

17. The method of claim 12, wherein the time-related field of the first instance is used to record at least one of a beginning time of displaying the first instance, an end time of displaying the first instance, a timespan of displaying the first instance, and a time code of displaying the first instance.

* * * * *